(12) United States Patent
Bagnoli

(10) Patent No.: US 7,841,437 B2
(45) Date of Patent: Nov. 30, 2010

(54) MOTORCYCLE HAVING A PLURALITY OF BRAKE CALIPERS ACTING ON ITS REAR WHEEL

(75) Inventor: Alessandro Bagnoli, Perignano Di Lari (IT)

(73) Assignee: Piaggio & C. S.p.A., Pontedera (Pisa) (IT)

( * ) Notice: Subject to any disclaimer, the term of this patent is extended or adjusted under 35 U.S.C. 154(b) by 303 days.

(21) Appl. No.: 12/157,873

(22) Filed: Jun. 13, 2008

(65) Prior Publication Data

US 2009/0000883 A1 Jan. 1, 2009

(30) Foreign Application Priority Data

Jun. 26, 2007 (IT) .......................... MI2007A1280

(51) Int. Cl.
*B62K 25/28* (2006.01)
*F16D 65/14* (2006.01)
(52) U.S. Cl. ..................................... 180/227; 280/288.4
(58) Field of Classification Search ................. 180/219, 180/227; 280/283, 284, 285, 286, 288, 288.4
See application file for complete search history.

(56) References Cited

U.S. PATENT DOCUMENTS 6,450,301 B1 * 9/2002 Iizuka et al. .................. 188/26
6,547,024 B2 * 4/2003 Ohyama et al. ............. 180/227
2006/0076197 A1 * 4/2006 Ishida ........................ 188/72.8

FOREIGN PATENT DOCUMENTS

EP 1186524 A2 * 3/2002

* cited by examiner

*Primary Examiner*—Lesley Morris
*Assistant Examiner*—Wesley Potter
(74) *Attorney, Agent, or Firm*—Hedman & Costigan, P.C.; James V. Costigan

(57) ABSTRACT

A motorcycle (10) is described, equipped with a rear drive wheel (12), rotatingly constrained to an oscillating arm (14) integral with the engine (16) of the motorcycle (10), at least one rear shock absorber (20), positioned between the oscillating arm (14) and the chassis (24) of the motorcycle (10), at least a first brake caliper (28) and at least a second brake caliper (32), acting on a single disc brake (36) fixed on the rim (38) of the rear drive wheel (12). The lower end (26) of the rear shock absorber (20) and the second brake caliper (32) are fixed to a plate (42) removably constrained to the oscillating arm (14) at one of its rear ends (14b). In this way, it is possible to have access to the rear drive wheel (12), and therefore remove it, without having to dismantle the second brake caliper (32) and relative transmission (34), thus facilitating the possible substitution of the wheel (12) or tire (46).

10 Claims, 6 Drawing Sheets

MOTORCYCLE HAVING A PLURALITY OF BRAKE CALIPERS ACTING ON ITS REAR WHEEL

BACKGROUND OF THE INVENTION

The present invention relates to a motorcycle equipped with a plurality of brake calipers acting on its rear wheel and a method for the rapid dismantling of the rear wheel of said motorcycle.

Most of the motorcycles currently on the market, especially high-performance motorbikes, are equipped with disc brakes on the rear wheel which substitute traditional drum-type brakes. Together with the undoubted advantages of improved braking, there is however the disadvantage of a more complicated dismantling, when necessary, of the rear drive wheel, due to the additional presence of the brake disc and relative caliper instead of the drum, which is directly positioned in the wheel rim.

Some motorcycles, in particular the so-called maxi-scooters, can also have a parking-brake system which, analogously to what is the case for the most common automobiles, allows the rear wheel of the vehicle to remain braked when it is parked. The parking-brake system is generally obtained by the addition of a second caliper which acts on the brake disc of the rear wheel separately with respect to the service brake caliper(s).

Due to the particularly reduced dimensions of scooter wheels, however, the addition of a further brake caliper, even if this acts on the same disc as that used for service braking, creates additional problems of space and certainly does not facilitate the dismantling of the rear wheel in the case of maintenance operations on the vehicle, but rather makes it even more complicated.

A motorcycle containing a pair of rear brake calipers is described, for example in the patent EP 1 186 524 B1, wherein both brake calipers of the motorcycle, in addition to the lower end of the rear shock absorber and the hub of the rear wheel itself are constrained to a rear end of the oscillating arm of the motorcycle. It is therefore evident that in a similar motorcycle, in order to dismantle the rear wheel to be able to substitute the tyre, for example, it is first necessary to dismantle all of the components constrained to the oscillating arm, including the parking-brake caliper and relative control linkage.

BRIEF SUMMARY OF THE INVENTION

An objective of the present invention is therefore to provide a motorcycle equipped with a plurality of brake calipers which act on its rear wheel wherein the dismantling of the whole rear axle is facilitated, thus making a possible substitution of the rear wheel or relative tyre simpler and more rapid with respect to what is the case with motorcycles of the known art.

A further objective of the present invention is to provide a motorcycle in which the application of a plurality of brake calipers which act on its rear wheel can be effected, in the manufacturing phase, in a simple and economical way.

These objectives according to the present invention are achieved by providing a motorcycle equipped with a plurality of brake calipers which act on its rear wheel, and also a method for the rapid dismantling of the rear wheel in said motorcycle, whose characteristics are specified in the enclosed independent claims.

Further characteristics of the invention are indicated in the dependent claims.

BRIEF DESCRIPTION OF THE SEVERAL VIEWS OF THE DRAWING

The characteristics and advantages of a motorcycle equipped with a plurality of brake calipers which act on its rear wheel according to the present invention will appear more evident from the following illustrative and non-limiting description, referring to the enclosed schematic drawings in which.

DETAILED DESCRIPTION OF THE INVENTION

Figure 1:
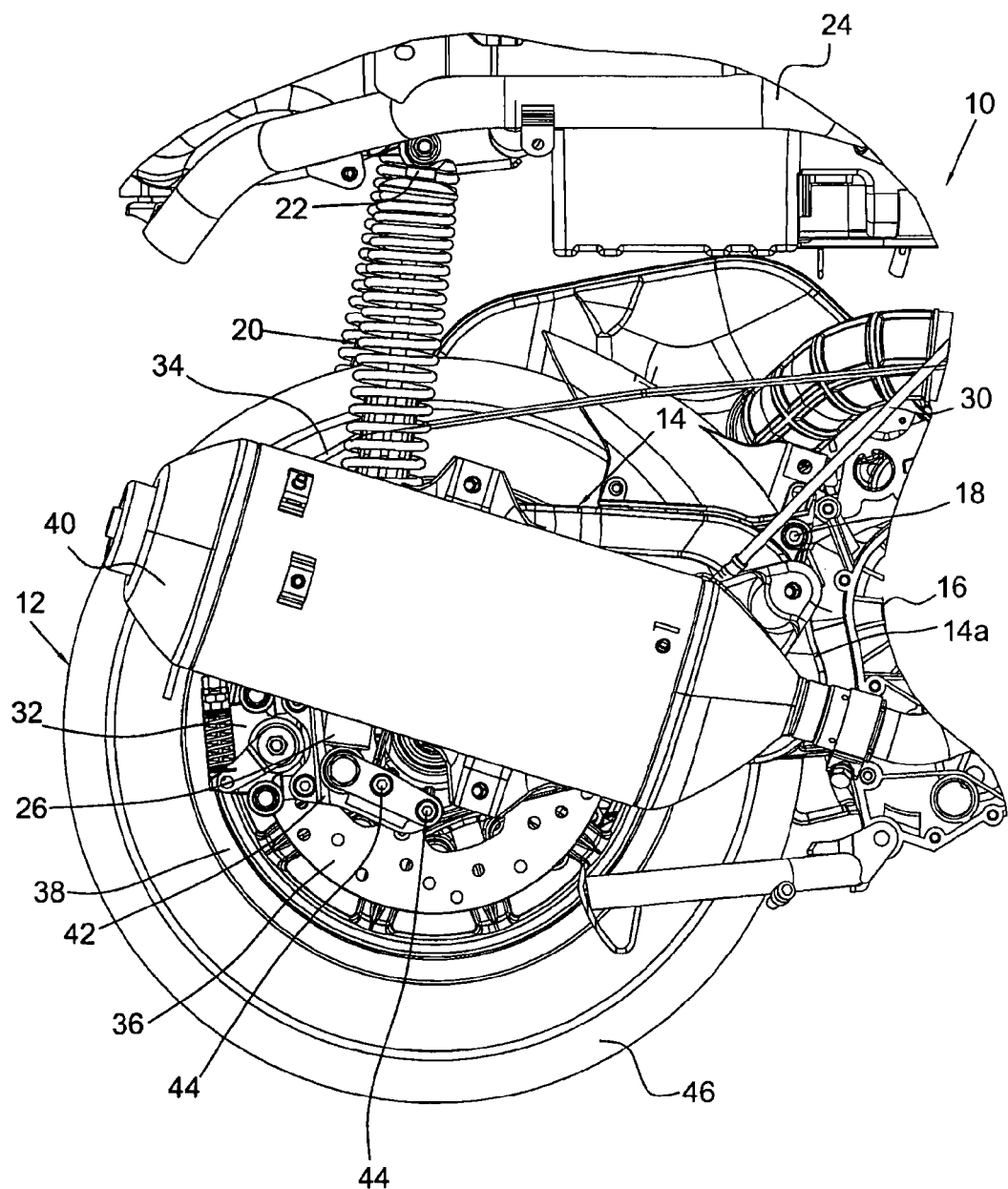
FIG. 1 is a detailed side view of the rear axle of a motorcycle equipped with a plurality of brake calipers which act on its rear wheel according to the present invention.
Figure 2:
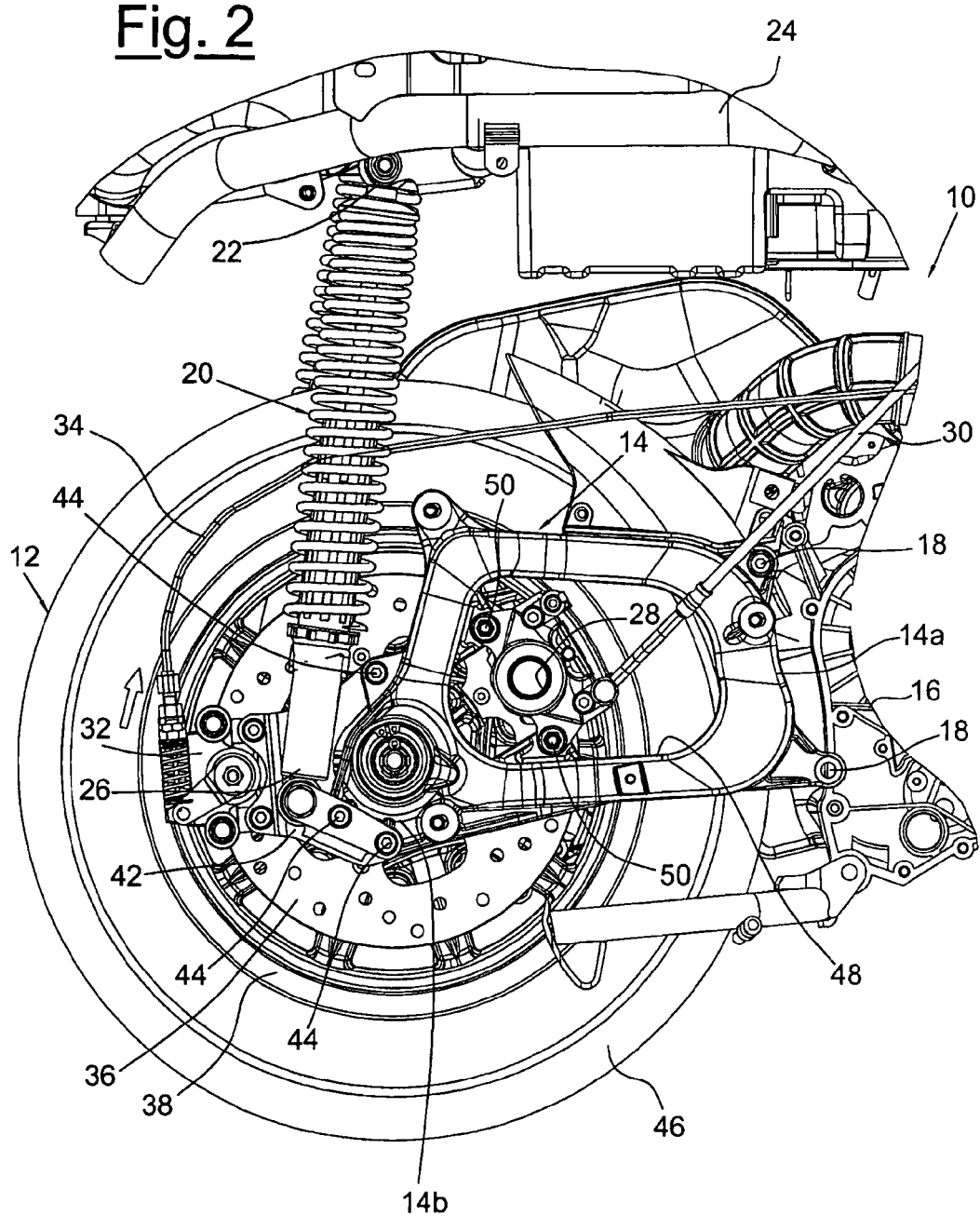
FIGS. 2 to 5 are detailed side views which show the subsequent dismantling phases of the components of the rear axle of the motorcycle of FIG. 1.
Figure 3:
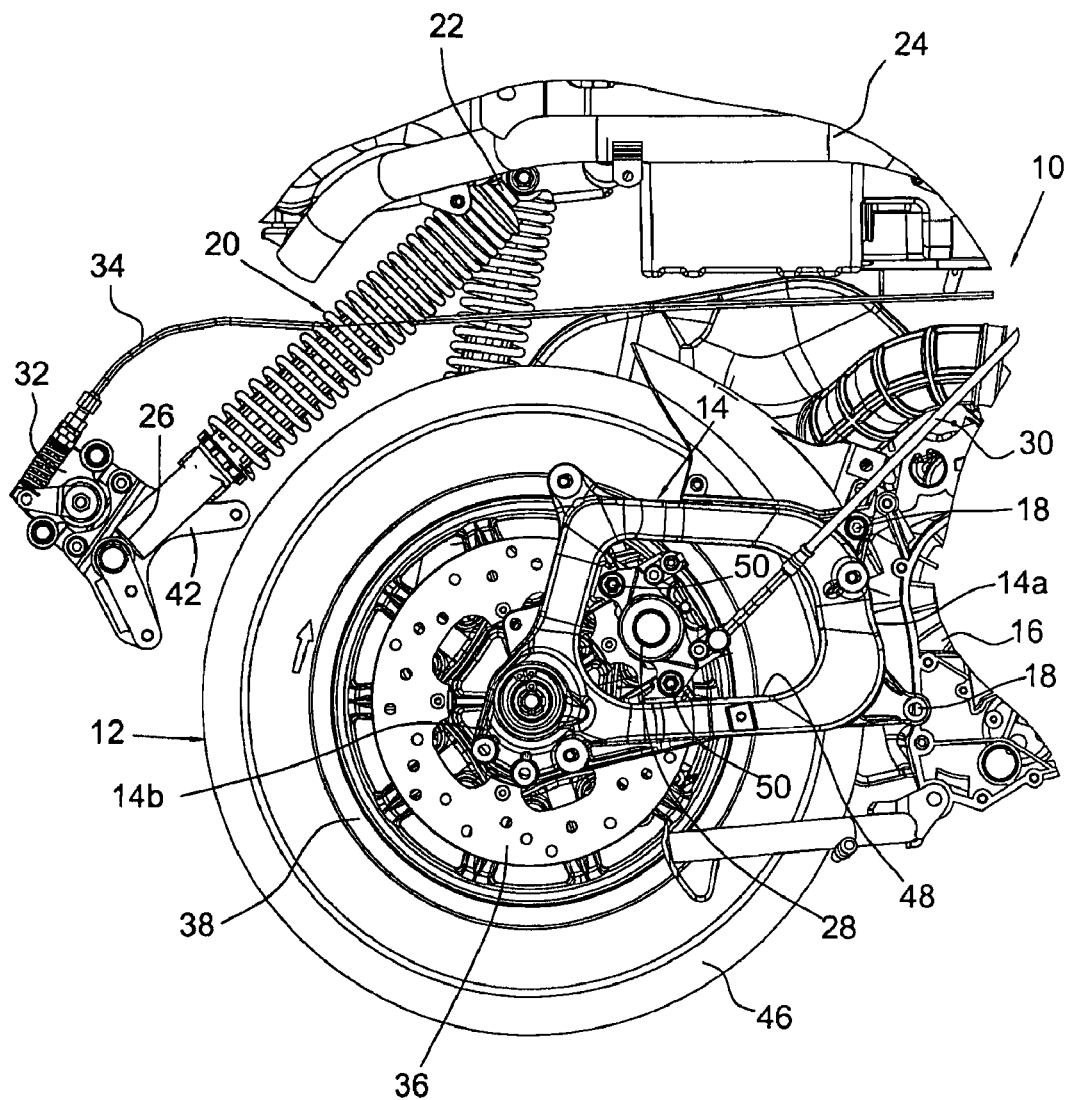
Figure 4:
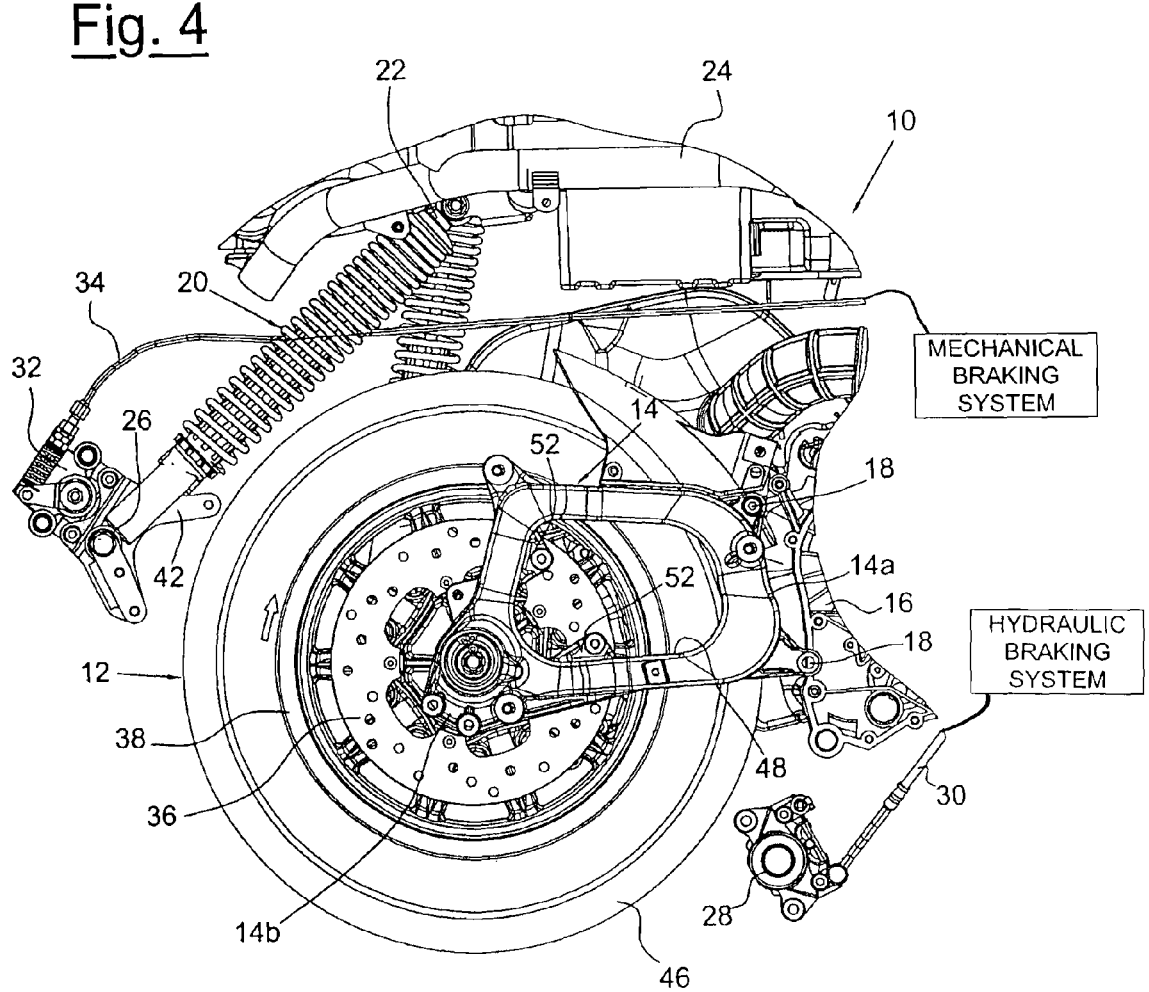
Figure 5:
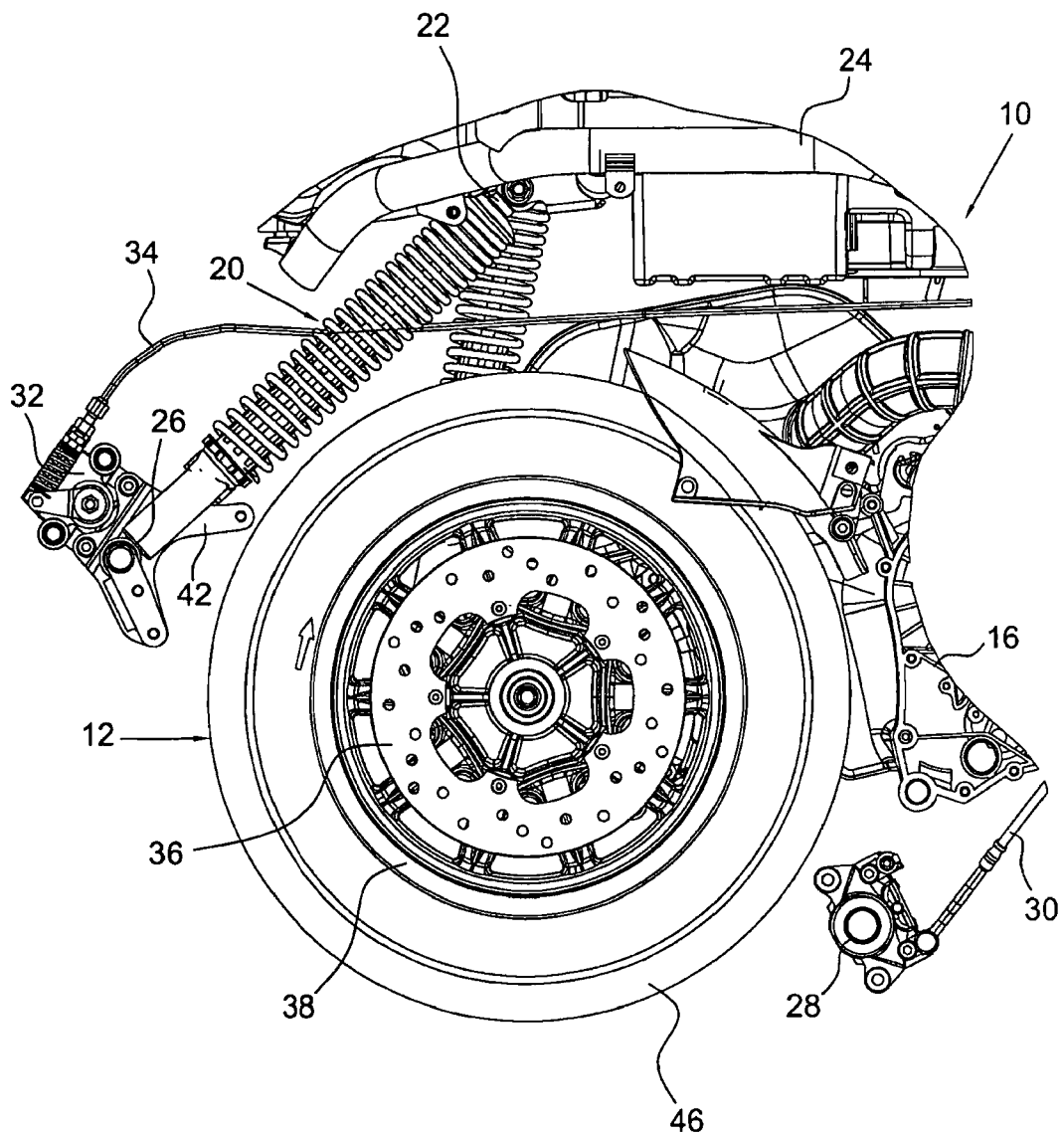

With reference to the figures, these show the rear axle of a motorcycle indicated as a whole with the reference number 10. The motorcycle 10, represented in the specific embodiment example by a scooter which can be equipped with one or two front steering wheels (not shown), is provided with a rear wheel 12 rotatingly constrained to an oscillating arm 14 integral, at one of its front ends 14a, with the engine 16 of the motorcycle 10 by means of a series of screws or bolts 18.

The upward or downward oscillation, in a substantially vertical direction, of the arm 14 is enabled by the presence of at least one rear shock absorber 20 whose upper end 22 is fixed to the chassis 24 of the motorcycle 10, whereas the lower end 26 of said shock absorber 20 is integral with the oscillating arm 14 itself at one of its rear ends 14b.

At least a first brake caliper 28, connected to the hydraulic service braking system by means of a control pipe 30, and at least a second brake caliper 32, connected to the system, preferably of the mechanical type, are also assembled on the oscillating arm 14, for parking-braking by means of a metallic control wire 34. Both of the service- 28 and parking- brake 32 calipers act on a single brake disc 36 assembled, in a fixed and known way, on the rim 38 of the rear drive wheel 12.

According to the illustrated explanatory embodiment, a silencer device 40, or muffler, of the motorcycle 10 is also fixed on the oscillating arm 14, as shown in FIG. 1 of the enclosed drawings.

According to the invention, the lower end 26 of the shock absorber 20 and at least one of the brake calipers, in this case the service brake caliper 28, are fixed to a removable plate 42 removably constrained, by means of one or more bolts 44, at the rear end 14b of the oscillating arm 14. In the dismantling phase of the rear wheel 12 of the motorcycle 10 and as will be better illustrated hereunder, this allows access to the rear wheel 12 itself without having to dismantle either the parking-brake caliper 32 or the shock absorber 20, thus facilitating a possible substitution of the wheel 12 and/or its tyre 46.

In order to reduce the encumbrances, there is preferably a pass-through opening 48 on the oscillating arm 14, inside which the service brake caliper 28 is situated. The service brake caliper 28 is therefore constrained to the oscillating arm 14 by means of bolts 50 which are inserted in respective holes situated in the fixing protuberances 52 which protrude inside the pass-through opening 48.

The dismantling procedure of the rear wheel 12 in a motorcycle 10 according to the present invention, described with reference to FIGS. 1-6, is as follows. After removing the silencer 40, by unscrewing the relative fixing screws (FIG. 1), it is possible to have access to the bolts 44 which constrain the plate 42 to the oscillating arm 14.

At this point, by simply unscrewing the bolts 44 and rotating the rear shock absorber 20 around the pin which constrains its upper end 22 to the chassis 24 of the motorcycle 10 (FIG. 3), it is possible to contemporaneously release both the shock absorber 20 and the parking-brake caliper 32 from the oscillating arm 14 without having to dismantle the parking-brake caliper 32 itself and the relative transmission 34 from the motorcycle 10.

Figure 6:
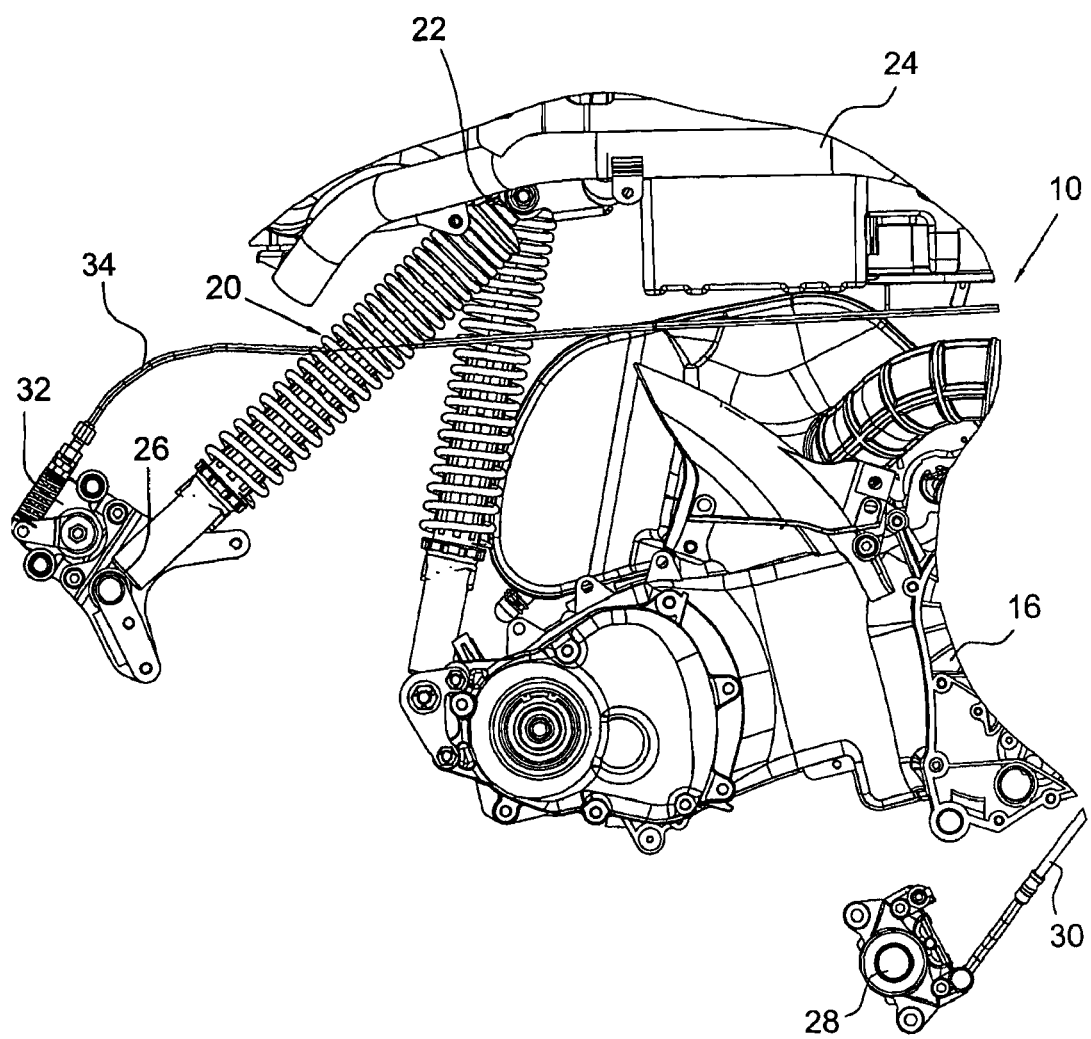
FIG. 6 is a detailed side view of the motorcycle of FIG. 1, at the end of the dismantling procedure of its rear wheel.

With the subsequent dismantling of the service brake caliper 28 (FIG. 4), without disconnecting it however from its hydraulic pipe 30, and the oscillating arm 14 (FIG. 5), by unscrewing the respective bolts 18 from the supports on the engine 16, it is possible to have access to the rear wheel 12 to remove it from the motorcycle 10, as can be seen in FIG. 6.

It should be pointed out that, as a result of the relative movements, however negligible these may be, between the various components of the rear axle of the motorcycle 10 when this is in movement, most of the fixing screws and bolts, along which the bolts 44 which keep the plate 42 constrained to the oscillating arm 14, are provided with respective elastic washers (not shown).

It can thus be seen that the motorcycle equipped with a plurality of brake calipers acting on its rear wheel according to the present invention achieves the objectives specified above. By applying the parking-brake caliper on the same plate, distinct from the oscillating arm, on which the lower end of the shock absorber is fixed, it is in fact possible to have access to the wheel and consequently remove it, without having to dismantle the parking-brake caliper and relative transmission, thus facilitating a possible substitution of the wheel or tyre.

The motorcycle equipped with a plurality of brake calipers acting on its rear wheel of the present invention thus conceived, can in any case undergo numerous modifications and variants, all included in the same inventive concept; furthermore, all the details can be substituted by technically equivalent elements. In practice, the materials used, as also the forms and dimensions, can vary according to technical requirements.

The protection scope of the invention is therefore defined by the enclosed claims.

The invention claimed is:

1. A motorcycle (10) equipped with a rear drive wheel (12), rotatingly constrained to an oscillating arm (14) integral with the engine (16) of the motorcycle (10), at least one rear shock absorber (20), positioned between said oscillating arm (14) and a chassis (24) of the motorcycle (10), at least a first brake caliper (28) and at least a second brake caliper (32), acting on a single brake disc (36) fixed on the rim (38) of said rear drive wheel (12), characterized in that the lower end (26) of said rear shock absorber (20) and said at least second brake caliper (32) are fixed to a plate (42) removably constrained to said oscillating arm (14) at one of two rear ends thereof (14*b*).

2. The motorcycle (10) according to claim 1, characterized in that said at least first brake caliper (28) is positioned inside a pass-through opening (48) situated on said oscillating arm (14).

3. The motorcycle (10) according to claim 2, characterized in that said at least first brake caliper (28) is constrained to said oscillating arm (14) by means of one or more bolts (50) which are inserted in respective holes situated in fixing protuberances (52) which protrude inside said pass-through hole (48).

4. The motorcycle (10) according to claim 1, characterized in that said plate (42) is constrained to said oscillating arm (14) at one of its rear ends (14*b*) by means of one or more bolts (44) each provided with a respective elastic washer.

5. The motorcycle (10) according to claim 1, characterized in that said at least first brake caliper (28) is connected to a hydraulic service braking system of the motorcycle (10) by means of at least one control pipe (30).

6. The motorcycle (10) according to claim 1, characterized in that said at least second brake caliper (32) is connected to a mechanical service braking system of the motorcycle (10) by means of at least one metallic control wire (34).

7. The motorcycle (10) according to claim 1, also comprising at least one silencer device (40) fixed onto said oscillating arm (14).

8. A method for the rapid dismantling of the rear drive wheel (12) in a motorcycle (10) equipped with a rear drive wheel (12) rotatingly constrained to an oscillating arm (14) integral with the engine (16) of the motorcycle (10), at least one rear shock absorber (20), positioned between said oscillating arm (14) and a chassis (24) of the motorcycle (10), at least a first brake caliper (28) and at least a second brake caliper (32), acting on a single brake disc (36) fixed on the rim (38) of said rear drive wheel (12), the lower end (26) of said rear shock absorber (20) and said at least second brake caliper (32) being fixed to a plate (42) removably constrained to said oscillating arm (14) at one of its rear ends (14*b*), the method comprising the following phases:

unscrewing the bolts (44) which constrain said plate (42) to said oscillating arm (14);

rotating said rear shock absorber (20) around a pin which constrains its upper end (22) to said chassis (24) of the motorcycle (10), contemporaneously releasing both said shock absorber (20) and said at least second brake caliper (32) from said oscillating arm (14);

dismantling said at least first brake caliper (28) and said oscillating arm (14), by unscrewing the respective bolts (18) from the supports on said engine (16); and removing said rear drive wheel (12) from the motorcycle (10).

9. The method according to claim 8, characterized in that, during the rotation phase of said rear shock absorber (20) around the pin which constrains its upper end (22) to said chassis (24) of the motorcycle (10), said at least second brake caliper (32) remains connected to a respective control means (34).

10. The method according to claim 8, characterized in that, during the dismantling phase of said at least first brake caliper (28), said at least a first brake caliper (28) remains connected to a respective control means (30).

* * * * *